(12) United States Patent
Siegle

(10) Patent No.: US 6,366,309 B1
(45) Date of Patent: *Apr. 2, 2002

(54) METHOD FOR THE TERRESTRIALLY TRANSMITTING DIGITAL SIGNALS

(75) Inventor: Gert Siegle, Hildesheim (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,676

(22) PCT Filed: Oct. 7, 1996

(86) PCT No.: PCT/DE96/01919

§ 371 Date: Sep. 15, 1997

§ 102(e) Date: Sep. 15, 1997

(87) PCT Pub. No.: WO97/15121

PCT Pub. Date: Apr. 24, 1997

(30) Foreign Application Priority Data

Oct. 16, 1995 (DE) .......................................... 195 38 302

(51) Int. Cl.⁷ ................................................. H04N 7/08
(52) U.S. Cl. ...................... 348/21; 348/487; 348/385.1; 348/388.1; 348/723; 455/103; 370/480; 370/343
(58) Field of Search ................................ 348/469, 487, 348/385.1, 388.1, 723, 725, 729, 17, 21, 720; 455/45, 103; 370/480, 481, 482, 484, 343, 344; H04N 7/08

(56) References Cited

U.S. PATENT DOCUMENTS 3,984,624 A 10/1976 Waggener .................. 348/473

4,914,651 A * 4/1990 Lusignan ................... 370/329

(List continued on next page.)

OTHER PUBLICATIONS

DE–Z Elektronik, Dr. Michael Thiele, "Digitaler Rundfunk in Den Startloechern", H. Nov. 1995, pp. 36–50.
DE–Z "Neues Von Rohde & Schwarz", H. 145 (1994/II), pp. 44, 45.
DE–Z "RFE", DIPL.–ING. Frank Mueller–Roemer", Digitale Systeme Fuer Hoerfunk Und Fersehen", Teil 1, pp. 26–29 (Mar. 1994).

Primary Examiner—Reinhard J. Eisenzopf
Assistant Examiner—Jean W. Désir
(74) Attorney, Agent, or Firm—Michael J. Striker

(57) ABSTRACT

A method is proposed that is used for terrestrial transmission of at least one digital signal, in particular a digital radio and/or TV broadcasting signal. In this method, the at least one digital signal, reduced in its data quantity by coding, is modulated, preferably by the OFDM method, and converted into the frequency position of at least one channel, adjacent to at least one occupied or unoccupied channel (30, 32) for transmitting an analog TV broadcasting signal, and is broadcast in this frequency position. The dynamic scope and the amplitude of the spectrum (41) of the at least one digital signal must undershoot a respectively predetermined value that is markedly less than the dynamic scope or amplitude of the video carrier of the spectrum (35, 36) of the analog TV broadcasting signal, so that there will be only slight intermodulation and cross modulation with other digital signals or with analog signals of other channels. The spectrum (41) of the at least one digital signal is transmitted, separated from at least one adjacent channel (30, 31) by a protective frequency margin (45). When a plurality of digital signals are transmitted in the at least one channel (31), the frequency ranges of at least two digital signals are transmitted, separated from one another by a protective frequency margin (50).

12 Claims, 6 Drawing Sheets

U.S. PATENT DOCUMENTS

| | | | | |
|---|---|---|---|---|
| 5,293,633 A | * | 3/1994 | Robbins | 455/3.1 |
| 5,309,235 A | * | 5/1994 | Naimpally | 348/476 |
| 5,357,284 A | * | 10/1994 | Todd | 348/486 |
| 5,406,551 A | * | 4/1995 | Saito et al. | 370/203 |
| 5,425,050 A | * | 6/1995 | Schreiber et al. | 375/200 |
| 5,450,392 A | * | 9/1995 | Waltrich | 370/201 |
| 5,510,834 A | * | 4/1996 | Weiss et al. | 348/97 |
| 5,521,943 A | * | 5/1996 | Dambacher | 375/295 |
| 5,561,468 A | * | 10/1996 | Bryan et al. | 348/469 |
| 5,574,496 A | * | 11/1996 | Nielsen et al. | 348/21 |
| 5,596,582 A | * | 1/1997 | Sato et al. | 370/509 |
| 5,675,572 A | * | 10/1997 | Hidejima et al. | 370/206 |
| 5,708,476 A | * | 1/1998 | Myhrvold et al. | 348/473 |
| 5,708,664 A | * | 1/1998 | Budge et al. | 370/538 |
| 5,710,767 A | * | 1/1998 | Segal et al. | 375/346 |
| 5,719,867 A | * | 2/1998 | Borazjani | 370/436 |
| 5,771,224 A | * | 6/1998 | Seki et al. | 370/206 |
| 5,818,813 A | * | 10/1998 | Saito et al. | 370/208 |
| 5,825,829 A | * | 10/1998 | Borazjani et al. | 375/308 |

* cited by examiner

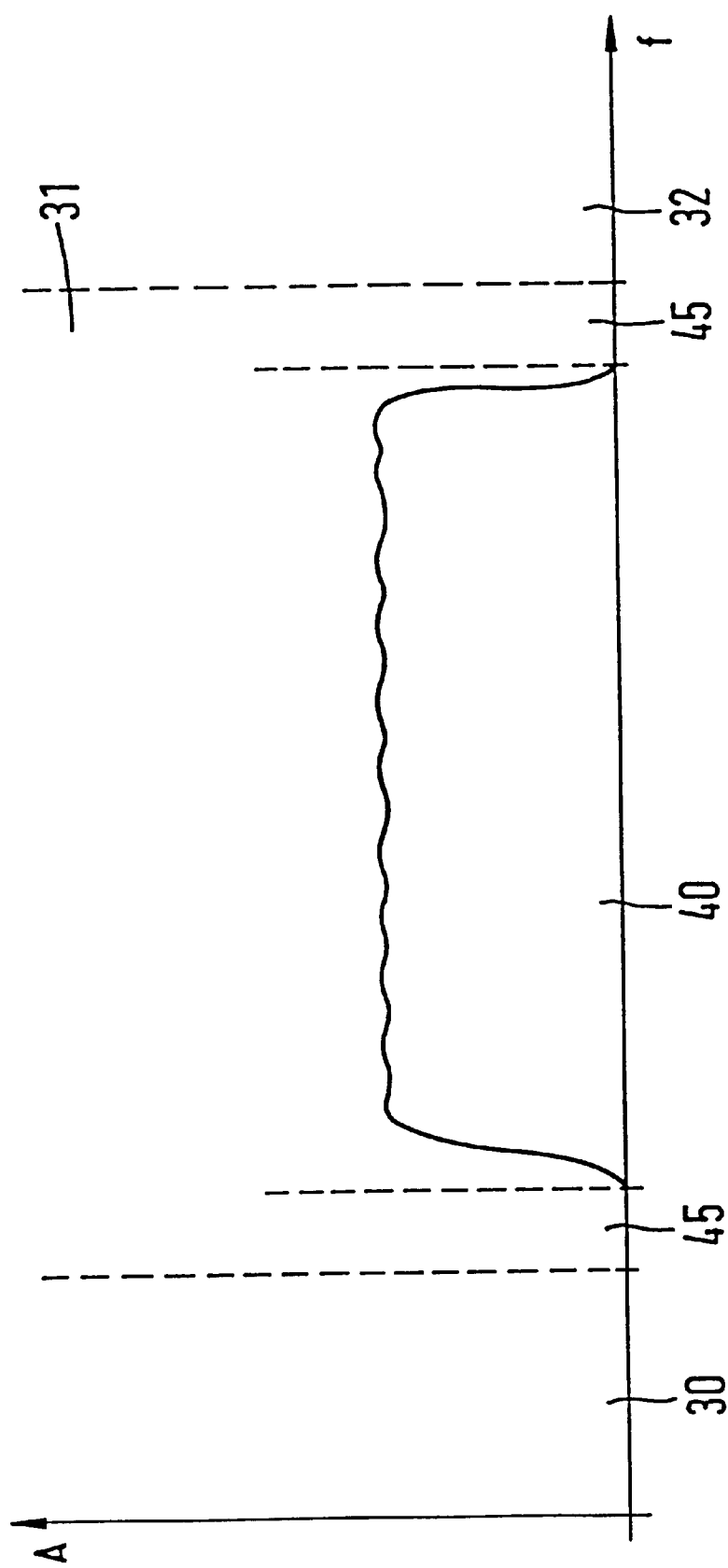

METHOD FOR THE TERRESTRIALLY TRANSMITTING DIGITAL SIGNALS

PRIOR ART

The invention is based on a method as generically defined by the main claim.

In terrestrial signal distribution of television signals, both topographic features and above all varying distances of the receiver from the various stations can create very great differences in field intensity at the reception site. The selectivity and linearity of the receiver input stage are at best always limited, and as a result, when all the theoretically possible TV channels and especially neighboring TV channels are occupied with analog-modulated TV programs, problems can occur because of excessive differences between the levels of the channel in use and the neighboring channel and because of cross modulation and intermodulation. The attempt is made to limit these problems by avoiding occupation of neighboring channels. The neighboring channels that are thus not usable are also called forbidden channels. Because of the area coverage and resultant overlaps among various stations for a certain region, the result of this is that by far not all of the terrestrially possible TV channels can be occupied. The resultant scarcity of frequencies is made even worse by the fact that for two stations that are broadcasting the same program, different frequencies have to be provided in the overlapping region, because otherwise common channel interference such as ghost images as a rule occur, because of differences in transit time and extinction zones from interference.

ADVANTAGES OF THE INVENTION

The method according to the invention having the characteristics of the main claim has the advantage over the prior art that the unused forbidden channels can be occupied by digital signals, and in particular digital radio and/or TV broadcasting signals, without causing significant intermodulation and cross modulation with other digital signals or with the analog signals of already-occupied channels. In this way, markedly more channels can be used for terrestrial signal distribution.

Advantageous further features of and improvements to the method disclosed in the main claim are possible by the provisions recited in the dependent claims.

To reduce intermodulation and cross modulation, a modulation of the digital signals by the OFDM method of claim 2 is advantageously used.

Claims 3 and 4 disclose the advantageous provision that at least one digital signal be transmitted at relatively low levels. As a result, the analog signals, which are more vulnerable to interference than digital signals, are not significantly impaired upon reception despite limited selectivity on the part of the receiver input stage.

Reducing the quantity of data in accordance with claim 5 attains the advantage that as many programs and/or data services as possible can be accommodated in the forbidden channels.

The provision of a protective frequency margin between the frequency range of at least one digital signal and at least one neighboring channel leads to an advantageous increase in protection from interference, given the always-limited selectivity of receiver input stages and decoding.

It is advantageous in accordance with claim 7 to use the same frequency and the same channel for a program or data service in the broadcasting by various stations. In this way, the best possible increase in the number of programs for terrestrial signal distribution within a specified frequency range is possible.

It is advantageous according to claim 8 to protect a plurality of digital data, radio and/or TV broadcasting signals against mutual influence on reception by using a protective frequency margin.

DRAWING

One exemplary embodiment of the invention is shown in the drawing and described in further detail in the ensuing description.

FIG. 1 shows an apparatus for the terrestrial broadcasting of digital data, radio and/or TV broadcasting signals;

FIGS. 2 and 3 each show one example for occupying three adjacent channels with analog and digital signal spectra;

FIG. 6 shows a channel occupation for the transmission of DVB signals.

DESCRIPTION OF THE EXEMPLARY EMBODIMENT

Figure 1:
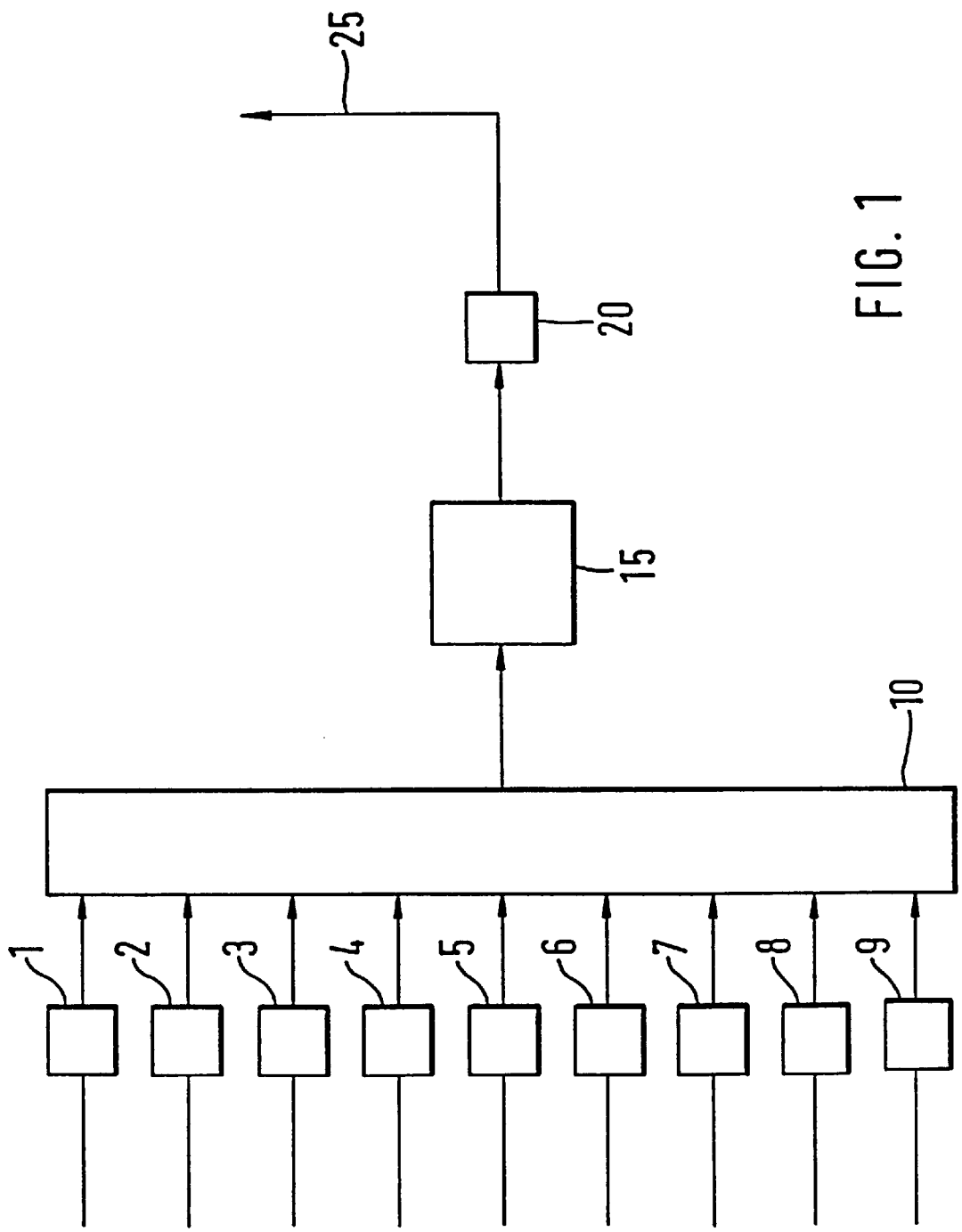

In FIG. 1, reference numeral 10 indicates a multiplexer, to which one digital TV broadcasting signal each is supplied via a first, second and third encoder 1, 2, and 3, and to which one digital radio signal each is supplied via a fourth through ninth encoder 4–9. The multiplexer 10 is connected via modulator 15 and an amplifier 20 to a transmitting antenna for terrestrial broadcasting of the digital radio and TV broadcasting signals.

Figure 2:
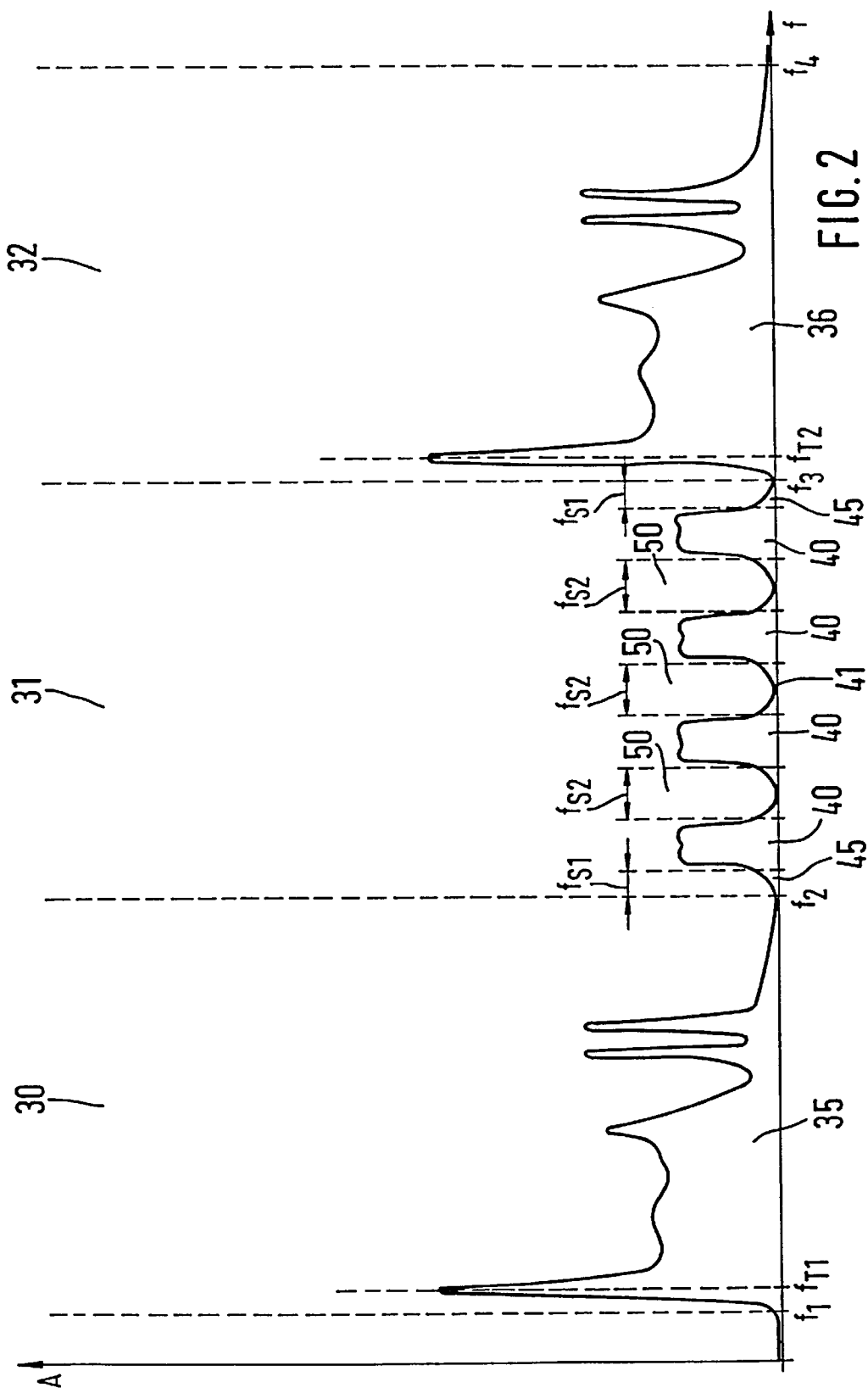
Figure 5:
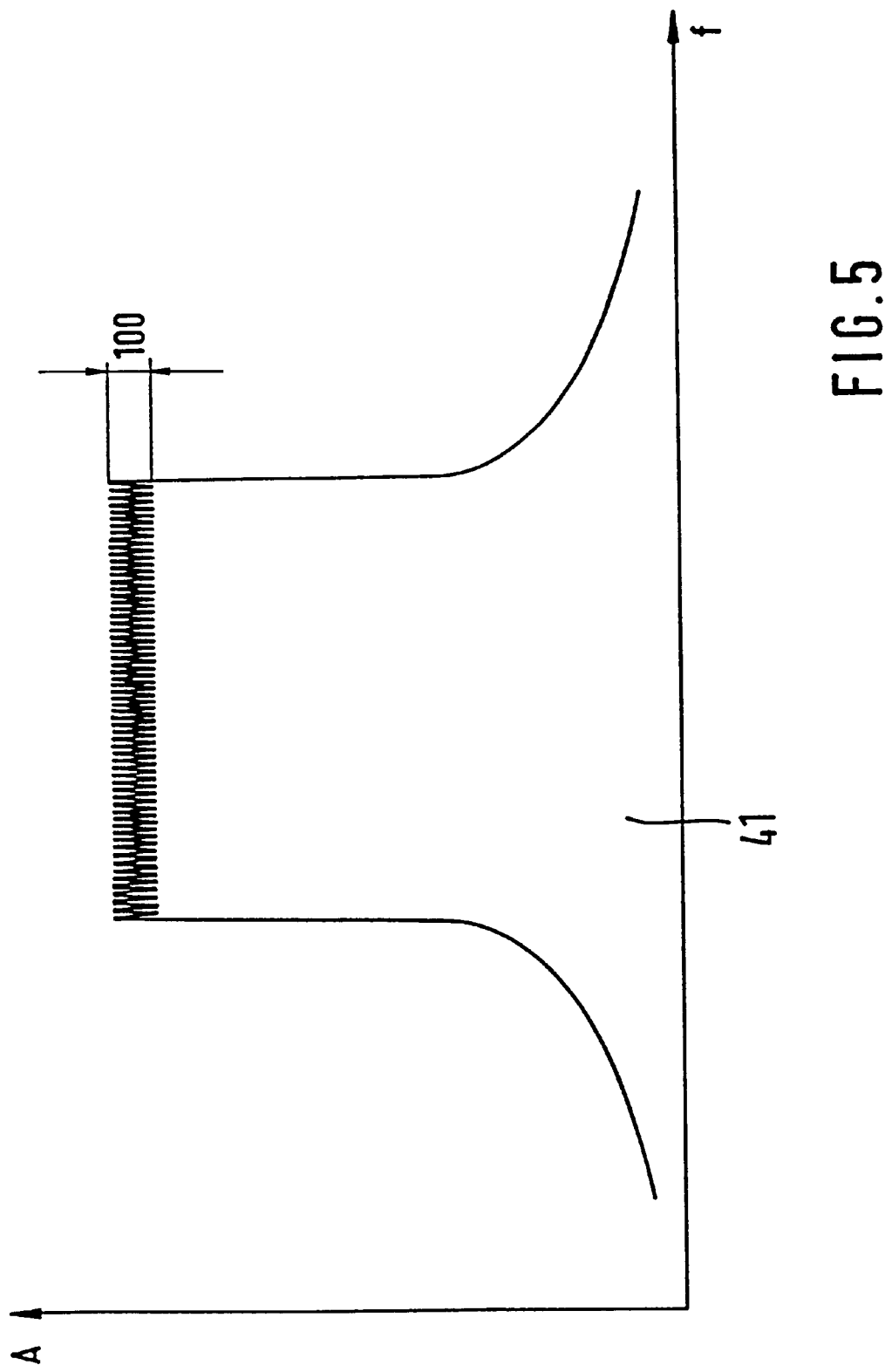
FIG. 5 shows a spectrum of a digital signal.

The encoders 1–9 reduce the data quantity of the digital TV broadcasting signals and digital radio signals, thus limiting the frequency spectra of the digital signals. For reducing the data quantity, data compression algorithms are suitable, such as MPEG 1, MPEG 2, or MPEG 4 (MPEG= motion picture expert group). For audio data reduction, the ISO MPEG 11172 standard, with its various layers, is suitable. The digital signals supplied to the multiplexer 10 via the encoders 1–9 are combined in the multiplexer 10 by frequency multiplexing into a digital signal and then subjected in the modulator 15 to a modulation process, such as preferably th OFDM method (OFDM=orthogonal frequency division multiplexing), and optionally also by a PSK method (PSK=phase shift keying) or a QAM method (QAM= quadrature amplitude modulation) with carrier suppression. One goal of this provision is the realization of a frequency spectrum 41 of the digital signal in accordance with FIG. 5, with a dynamic scope 100 that undershoots a predetermined value in order to reduce intermodulation and cross modulation with other digital signals or with analog signals. A further goal of this provision is to limit the amplitude of the frequency spectrum 41 of the digital signal to a predetermined value, and to convert the digital signal to the frequency position of a channel 31, which is adjoined in the direction of lower and higher frequencies by two channels 30 and 32 as shown in FIG. 2. The modulated digital signal is then adjusted in level, to a value that as a rule can be markedly lower than the peak level of the analog TV broadcasting signals, and broadcast from the transmitting antenna 25.

FIG. 2 shows an example of how the channel 31 for the digital signal, the channel 30 adjacent to it in the direction of lower frequencies for an analog TV broadcasting signal, and the channel 32 adjacent to it in the direction of higher frequencies, also for an analog TV broadcasting signal, are occupied. In the graph of FIG. 2, the amplitude A of the corresponding frequency spectrum is plotted over the frequency f. In the description below, the adjacent analog channel 30 in the direction of lower frequencies will be called the first channel, the channel 31 for the digital signal will be call the second channel, and the adjacent analog channel 32 in the direction of higher frequencies will be called the third channel. The first channel 31 is limited by a lower limit frequency $f_1$ and an upper limit frequency $f_2$ and includes the spectrum 35 of a first analog TV broadcasting signal with a video carrier at the frequency $f_{T1}$. The third channel 32 is limited by a lower limit frequency $f_3$ and an upper limit frequency $f_4$ and includes the spectrum 36 of a second analog TV broadcasting signal with a video carrier at the frequency $f_{T2}$. The second channel 31 for the digital signal is limited by the upper limit frequency $f_2$ of the first channel 30 and the lower limit frequency $f_3$ of the third channel 32. The second channel 31, as a neighboring channel to two analog channels 30 and 32, is a so-called forbidden channel. The spectrum of the digital signal is divided into four blocks, each separated from one another by a protective frequency margin 50 having the frequency width $f_{S2}$. One protective frequency margin 45 each, whose frequency width is $f_{S1}$, is provided between the spectrum 41 of the digital signal and the upper limit frequency $f_2$ of the first channel 30, and between that spectrum and the lower limit frequency $f_3$ of the third channel 32. At a frequency width of approximately 7 MHz for the second channel 31, this second channel 31 can be divided into four blocks, each of about 1.5 MHz, and the remaining about 1 MHz can be used for the protective frequency margins 50 between the individual blocks 40 and for the protective frequency margins 45 between the spectrum 41 of the digital signal and the upper limit frequency $f_2$ of the first channel 30 and between that spectrum and the lower limit frequency $f_3$ of the third channel 32.

At a frequency width of about 8 MHz for the second channel 31, this second channel 31 can again be divided into four blocks, each of about 1.5 MHz, and the remaining about 2 MHz can be used for the protective frequency margins 50 between the individual blocks 40 and for the protective frequency margins 45 between the spectrum 41 of the digital signal and the upper limit frequency $f_2$ of the first channel 30 and between that spectrum and the lower limit frequency $f_3$ of the third channel 32. By means of the modulation in the modulator 15, the spectrum 41 of the digital signal is limited to a predetermined value, which is markedly less than the amplitudes of the video carriers of the analog TV broadcasting signals at the frequencies $f_{T1}$ and $f_{T2}$. Moreover, by the modulation, the dynamic scope 100 and the amplitude of the spectrum 41 of the digital signal are each limited to a predetermined value, which is markedly less than the dynamic scope and the amplitude of the video carrier of the spectra 35 and 35 of the analog signals of the first and third channels 30 and 32, respectively. In this way, there is only slight intermodulation and cross modulation of the digital signals with one another and with the analog signals of the first and third channels 30 and 32. By the use of one of the above-named modulation methods and by transmitting the digital signals at levels that are markedly lower than those of the analog signals, peak levels in the digital signal are averted. This reduces interference in the analog TV broadcasting signals in a receiver that has limited selectivity, and this is also achieved through the protective frequency margins 45 between the spectrum 41 of the digital signal and the upper limit frequency $f_2$ of the first channel 30 and between that spectrum and the lower limit frequency $f_3$ of the third channel 32. The protective frequency margins 50 between the individual blocks of the spectrum 41 of the digital signal serve to protect the respective blocks, containing the digital radio and/or TV broadcasting signals, from influencing one another. Influence on the digital signals in the receiver on the part of the analog TV broadcasting signals that occur and are received parallel to them has only a negligible effect, because of the greater security against interference, given the selected digital signal transmission and digital signal processing and given the use, which can be provided as an option, of error-correction block methods, interleaving, and/or external error protection, such as of the Reed Solomon type. In each of the four blocks 40 of FIG. 2, at least six audio/radio stereo programs can be accommodated by data compression using ISO MPEG 11172 layer 2, or at least one TV program can be transmitted by data compression using MPEG 1 or 2. The ISO MPEG 11172 layer 3 standard allows the expansion, per 1.5-MHz block 40, from six to up to twelve audio/radio programs at a transmission rate of 128 kB/s per audio/radio program, and the MPEG 4 standard allows an expansion in the number of TV programs to at least two per 1.5-MHz block. In the second channel 31 for the digital signal, other additional digital signals or other signal contents can also be transmitted individually or in blocks. These include, as examples, such data services as paging, message services, electronic newspapers, updates from data bases, traffic reports and visual traffic displays, stock-exchange data, transportation schedules, and so forth, as well as DVB signals (DVB=digital video broadcasting), which are currently defined for an 8-MHz raster, for occupying forbidden UHF channels. In a design for a 7-MHz raster, it is also possible for the DVB signals to occupy forbidden VHF channels. Then as shown in FIG. 6, one self-contained coded frequency block 40 at a time is transmitted in the second channel 31, with protective frequency margins 45 from the adjacent channels 30 and 32.

The supplemental occupation of forbidden channels in regions that use the PAL B/G standard can be quantified as follows:

Band I (VHF):
One additional 7-MHz channel, if only channel E2, which has a video carrier frequency of 48.25 MHz, and channel E4, which has a video carrier frequency of 62.25 MHz, are occupied with TV programs; and
two additional 7-MHz channels, if only channel E3, which has a video carrier frequency of 55.25 MHz, is occupied.

Band IV (UHF):
Eight additional 8-MHz channels, or more, depending on the occupation with analog modulated TV programs.

Band V (UHF):
Fourteen additional 8-MHz channels, or more, depending on the occupation with analog modulated TV programs.

Figure 3:
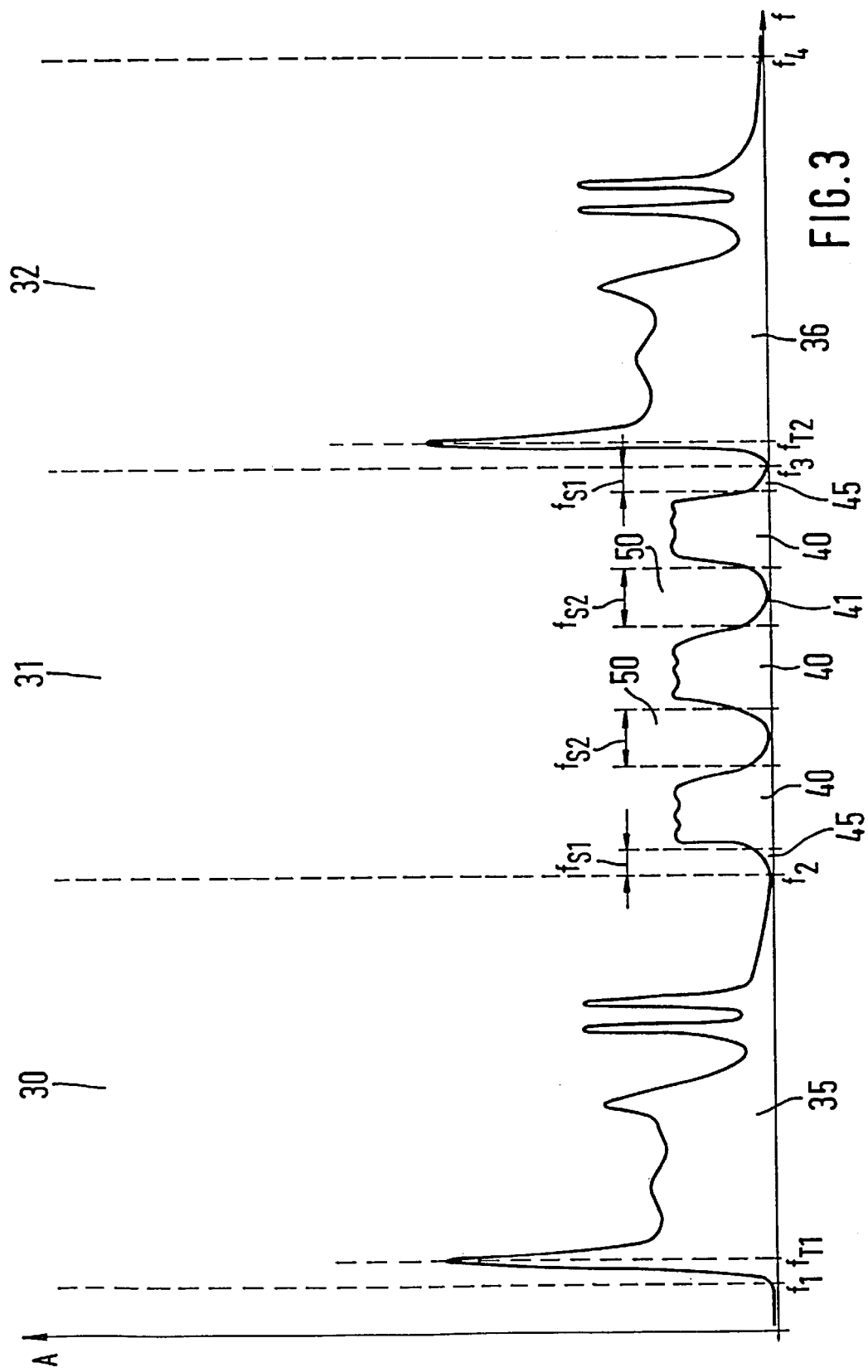

In a further exemplary embodiment according to FIG. 3, the occupation of the first channel 30 and the third channel 32 is achieved as in FIG. 2, each with the spectrum 35 and 36, respectively, of an analog TV broadcasting signal. However, the spectrum 41 of the digital signal in the second channel 31 is divided into three blocks, each separated from one another by a respective protective frequency margin 50 with a frequency width $f_{S2}$ and from the upper limit frequency $f_2$ of the first channel 30 and the lower limit frequency $f_3$ of the third channel, and by a protective frequency margin 45 with a frequency width $f_{S1}$. This realization is appropriate, if a 6-MHz raster and a block width of approximately 1.5 MHz are used. The remaining approximately 1.5 MHz are used for the protective frequency margins 50 between the individual blocks 40 and for the protective frequency margins 45 between the spectrum 41 of the digital signal and the upper limit frequency $f_2$ of the first channel 30 and between that spectrum and the lower limit frequency $f_3$ of the third channel 32.

The possibility also exists of selecting other block widths than 1.5 MHZ, or even, as with DVB, of using the full second channel 31 in its entirety from the outset.

When the OFDM modulation method is used, it becomes possible, by simultaneous broadcasting, to use the same frequency in the same channel in the propagation region for the same program broadcast by different stations.

Figure 4:
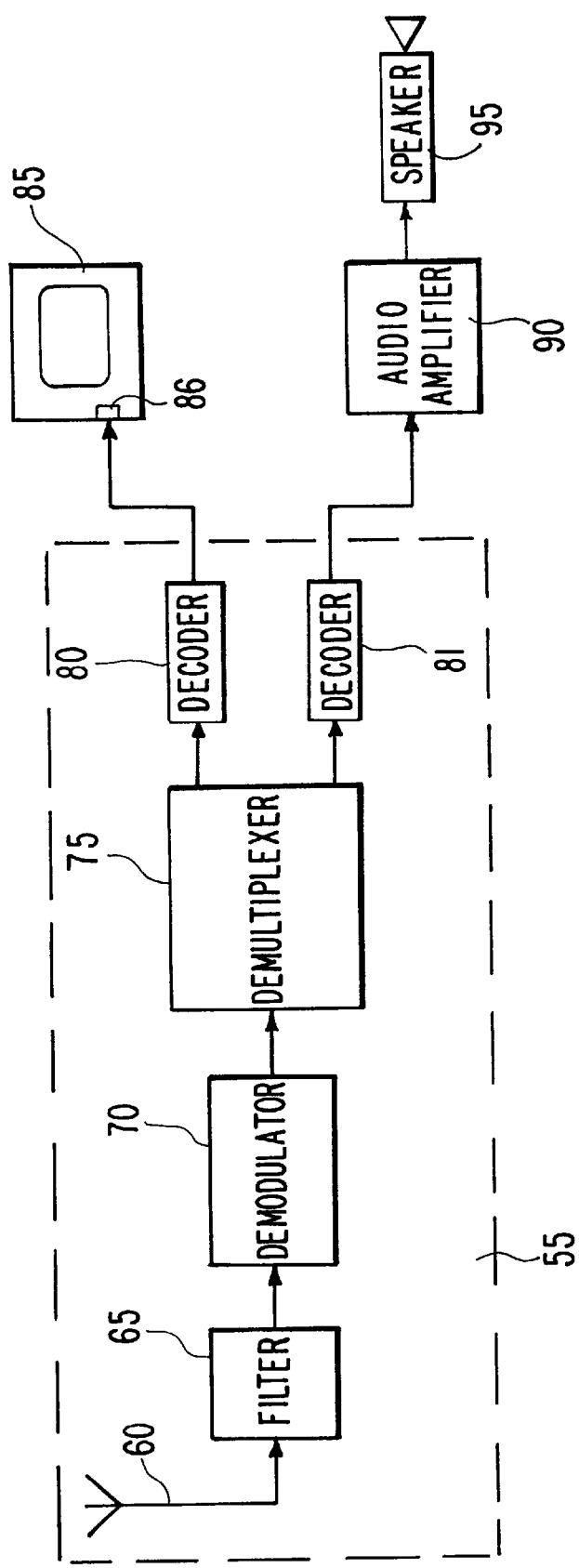
FIG. 4 shows an apparatus for receiving the terrestrially transmitted digital signals.

In FIG. 4, reference numeral 55 indicates a receiver with a receiving antenna 60, which is connected to a demultiplexer 75 via a bandpass filter 65 and a demodulator 70. The receiver 55 also includes a decoder 80 for digital TV broadcasting signals and a decoder 81 for digital radio signals. The decoder 80 for digital TV broadcasting signals is supplied with the digital TV broadcasting signals arriving from the demultiplexer 75, and the decoder 81 for digital radio signals. The decoder 80 for digital radio signals is supplied with the digital radio signals also arriving from the demultiplexer 75. The decoded digital TV broadcasting signals are delivered to the digital input 86 of a TV set 85, and the decoded digital radio signals are delivered to a speaker 95 via an audio amplifier 90 to a speaker 95.

The signal received by the receiver 55 via the receiving antenna 60 includes both the digital TV broadcasting signals and the digital radio signals, which after being combined into a digital signal by the circuit of FIG. 1 have been broadcast terrestrially. In the bandpass filter 65, the second channel 31, in which this digital signal is transmitted, is selected. The selected digital signal is then delivered to the demodulator 70, where it is demodulated. The demodulated digital signal is finally split in the demultiplexer 75 into two digital signals; the one digital signal contains the digital TV programs, and the other digital signal contains the digital audio/radio programs. In the decoder 80 for digital TV programs and in the decoder 81 for digital audio/radio programs, finally, the digital TV broadcasting signals and the digital radio signals, respectively, are expanded. The expanded digital signal that contains the digital TV broadcasting signals is then delivered to the digital input 86 of the TB set 85, and there is split up into the individual TV programs, subjected to a digital/analog conversion, and finally reproduced in images and sound. The expanded digital signal that the digital radio signals contains is delivered to the audio amplifier 90, split up there into the individual audio/radio programs, subjected to a digital/analog conversion, amplified, and delivered to the speaker 95 for audio reproduction.

In further embodiments of the method of the invention, only the dynamic scope 100 of the spectrum 41 of the digital signal is limited by the modulation to a predetermined value; in other embodiments, only a limitation of the amplitude of the digital spectrum 41 to a predetermined value takes place. In those cases, then as a rule a greater protective frequency margin 45 from the neighboring channels 30 and 32 is present, or else receiver input stages with greater selectivity are used.

What is claimed is:

1. A method for terrestrial transmission of at least one digital signal, in particular a digital radio and/or TV broadcasting signal, comprising the steps of transmitting at least one digital signal over at least one channel which is adjacent to at least one occupied or unoccupied channel for transmitting an analog TV broadcasting signal; undershooting by the dynamic compass of the spectrum of the at least one digital signal a predetermined value, which is markedly less than the dynamic compass of the spectrum of the analog TV broadcasting signal; and/or undershooting by the amplitude of the spectrum of the at least one digital signal a predetermined value which is markedly less than the amplitude of the video carrier of the analog TV broadcasting signal.

2. A method as defined in claim 1, and further comprising transmitting the at least one digital signal modulated by the coded orthogonal frequency division multiplexing.

3. A method as defined in claim 1, and further comprising transmitting the at least one digital signal at levels that do not exceed a predetermined value that is markedly lower than a peak level of the analog TV broadcasting signal.

4. A method as defined in claim 1, and further comprising reducing a data quantity of the at least one digital signal by coding.

5. A method as defined in claim 1, and further comprising transmitting a frequency range of the at least one digital signal in the at least one channel separately from at least one adjacent occupied or unoccupied channel by a protective frequency margin.

6. A method as defined in claim 1, and further comprising broadcasting a propagation region digital signals of identical content, modulated by coded orthogonal frequency division multiplexing, at a same frequency and in a frequency range of the at least one channel.

7. A method as defined in claim 1, and further comprising, upon transmission of a plurality of individual digital signals or digital signals combined into blocks in the at least one channel, transmitting frequency ranges of at least two digital signals separated from one another by a protective frequency margin.

8. The method of claim 1, characterized in that in the at least one channel (31), a self-contained coded frequency block (40), in particular containing DVB signals, is transmitted with protective frequency margins (45) from the adjacent channels (30) and (32).

9. A method for terrestrial transmission of at least one digital signal, in particular a digital radio and/or TV broadcasting signal, comprising the steps of transmitting at least one digital signal over at least one channel (31), which is adjacent to at least one occupied or unoccupied channel (30, 32) for transmitting an analog TV broadcasting signal; undershooting by the dynamic compass (100) of the spectrum (41) of the at least one digital signal a predetermined value, which is markedly less than the dynamic compass of the spectrum (35, 36) of the analog TV broadcasting signal; undershooting by the amplitude of the spectrum (41) of the at least one digital signal a predetermined value which is markedly less than the amplitude of the video carrier of the analog TV broadcasting signal; and receiving the at least one digital signal at a level that is lower by up to approximately 20 db than the peak level of the analog TV broadcasting signal.

10. A method for terrestrial transmission of at least one digital signal, in particular a digital radio and/or TV broadcasting signal, comprising the steps of transmitting at least one digital signal over at least one channel (31), which is adjacent to at least one occupied or unoccupied channel (30, 32) for transmitting an analog TV broadcasting signal; undershooting by the dynamic compass (100) of the spectrum (41) of the at least one digital signal a predetermined value, which is markedly less than the dynamic compass of the spectrum (35, 36) of the analog TV broadcasting signal; undershooting by the amplitude of the spectrum (41) of the at least one digital signal a predetermined value which is markedly less than the amplitude of the video carrier of the analog TV broadcasting signal,; dividing the at least one channel (31), for a channel width of approximately 6 MHz, into three blocks (40) approximately 1.5 MHz each, and utilizing the remaining approximately 1.5 MHz as protective frequency margins (50) between the individual blocks (40) and as protective frequency margins (45) between the frequency range of the digital spectrum (41) and one upper and one lower neighboring channel (32) and (30).

11. A method for terrestrial transmission of at least one digital signal, in particular a digital radio and/or TV broadcasting signal, comprising the steps of transmitting at least one digital signal over at least one channel (31), which is adjacent to at least one occupied or unoccupied channel (30, 32) for transmitting an analog TV broadcasting signal; that the dynamic compass (100) of the spectrum (41) of the at least one digital signal undershoots a predetermined value, which is markedly less than the dynamic compass of the spectrum (35, 36) of the analog TV broadcasting signal; undershooting by the amplitude of the spectrum (41) of the at least one digital signal a predetermined value which is markedly less than the amplitude of the video carrier of the analog TV broadcasting signal, dividing the at least one channel (31), for a channel width of approximately 7 MHz, into four blocks (40) of approximately 1.5 MHz each, and utilizing the remaining 1 MHz as protective frequency margins (50) between the individual blocks (40) and as a protective frequency margins (45) between the frequency range of the digital spectrum (41) and the upper and lower neighboring channels (32) and (30).

12. A method for terrestrial transmission of at least one digital signal, in particular a digital radio and/or TV broadcasting, comprising the steps of transmitting the at least one digital signal over at least one channel (31), which is adjacent to at least one occupied or unoccupied channel (30, 32) for transmitting an analog TV broadcasting signal; undershooting by the dynamic compass (100) of the spectrum (41) of the at least one digital signal a predetermined value, which is markedly less than the dynamic compass of the spectrum (35, 36) of the analog TV broadcasting signal; and/or undershooting by the amplitude of the spectrum (41) of the at least one digital signal a predetermined value which is markedly less than the amplitude of the video carrier of the analog TV broadcasting signal, dividing the at least one channel (31), for a channel width of approximately 8 MHz, into four blocks (40) of approximately 1.5 MHz each, and the remaining approximately 2 MHz as protective frequency margins (50) between the individual blocks (40) and as protective frequency margins (45) between the frequency range of the digital spectrum (41) and the upper and lower neighboring channels (32) and (30).

* * * * *